United States Patent [19]

Geyer et al.

[11] Patent Number: 4,964,113
[45] Date of Patent: Oct. 16, 1990

[54] MULTI-FRAME TRANSMISSION CONTROL FOR TOKEN RING NETWORKS

[75] Inventors: Joel Erwin Geyer, Cary; Joseph K. Lee; Kenneth T. Wilson, both of Raleigh, all of N.C.

[73] Assignee: International Business Machines Corporation, Armonk, N.Y.

[21] Appl. No.: 424,850

[22] Filed: Oct. 20, 1989

[51] Int. Cl.$^5$ .............................................. H04J 3/02
[52] U.S. Cl. .................................................. 370/85.5
[58] Field of Search ............................ 370/85.4, 85.5; 340/825.05

[56] References Cited

U.S. PATENT DOCUMENTS

| | | | |
|---|---|---|---|
| 4,404,557 | 9/1983 | Grow | 370/85.5 |
| 4,536,874 | 8/1985 | Stoffel et al. | 370/85.4 |
| 4,667,323 | 5/1987 | Engdahl et al. | 370/85.4 |
| 4,926,418 | 5/1990 | Cidon et al. | 370/85.4 |

*Primary Examiner*—Douglas W. Olms
*Assistant Examiner*—Min Jung
*Attorney, Agent, or Firm*—John J. Timar

[57] ABSTRACT

A method and apparatus for enabling the transmitter to decide the number of variable length frames that can be trasmitted within the token holding timer (THT) window. The last frame decision algorithm enables the transmitter to set the intermediate frame bit in the ending delimiter to the right state to indicate the status of each frame in the transmitted frame sequence. A look-ahead technique is used to check the remaining transmit time available in the THT time window, therefor, no ring bandwidth is wasted on partially transmitted aborated frames, effectively optimizing the throughput of the network. Since key variables in the last frame decision algoritm are softwar programmable, the algorithm is independent of ring speed. The algorithm counts transmitted octets instead of measuring transmission time in deciding whether to transmit an additional frame. The algorithm can be applied to either signal frame or multi-frame transmit mode and to either normal or early token release. It is applicable to both the IEEE 802.5 local area network standard for token ring networks and the AnSI X3T9.5 standard for FDDI.

15 Claims, 6 Drawing Sheets

FIG. 1A
FRAME STRUCTURE (IEEE 802.5)

| SD | AC | FC | DA | SA | INFORMATION | FIELD | FCS | ED | FS |
|----|----|----|----|----|-------------|-------|-----|----|----|
| 1  | 1  | 1  | 6  | 6  |             |       | 4   | 1  | 1  |

↑— NUMBER OF BYTES

NOTES:

SD = START DELIMITER  DA = DESTINATION ADDRESS
ED = END DELIMITER  SA = SOURCE ADDRESS
AC = ACCESS CONTROL FIELD  FCS = FRAME CHECK SEQUENCE
FC = FRAME CONTROL FIELD  FS = FRAME STATUS FIELD

FIG. 1B
START DELIMITER (TRANSITIONAL DATA PATTERN)

| 1 | 1 | 0 | 1 | 0 | 0 | 1 | 1 | 0 | 1 | 0 | 0 | 0 | 0 | 0 | 0 |
|---|---|---|---|---|---|---|---|---|---|---|---|---|---|---|---|

BAUD NUMBER: 0 1 2 3 4 5 6 7 8 9 10 11 12 13 14 15

BIT NUMBER: 0 | 1 | 2 | 3 | 4 | 5 | 6 | 7

FIG. 1C
END DELIMITER (TRANSITIONAL DATA PATTERN)

| 1 | 1 | 0 | 1 | 1 | 0 | 1 | 1 | 0 | 1 | 1 | 0 | I | 0 | EDI | 0 |
|---|---|---|---|---|---|---|---|---|---|---|---|---|---|-----|---|

BAUD NUMBER: 0 1 2 3 4 5 6 7 8 9 10 11 12 13 14 15

BIT NUMBER: 0 | 1 | 2 | 3 | 4 | 5 | 6 | 7

NOTE:

I = INTERMEDIATE FRAME BIT  EDI = ERROR DETECT INDICATOR BIT
I = 0 → LAST FRAME
I = 1 → INTERMEDIATE FRAME  EDI = 0 → NO ERROR DETECTED IN FRAME DATA
EDI = 1 → ERROR DETECTED IN FRAME DATA

NOTE:
P = PRIORITY CONTROL BITS
R = RESERVATION CONTROL BITS
TI = TOKEN INDICATOR BIT (0 = TOKEN, 1 = FRAME)
MC = MONITOR CONTROL BIT

MULTI-FRAME TRANSMISSION CONTROL FOR TOKEN RING NETWORKS

REFERENCE TO RELATED APPLICATIONS

This application is related to co-pending patent application, Ser. No. 07/422,168 filed on Oct. 11, 1989 and entiled, "Multi-Frame Stripping Protocol for Token Ring Networks." The co-pending patent application has the same assignee as this application. The co-pending application discloses a multi-frame stripping algorithm for a token ring network using early token release which recovers the ring in the minimum possible time when corrupted frames are present on the ring.

BACKGROUND OF THE INVENTION

This invention relates to communication networks in general and more particularly to a method and apparatus for providing optimal utilization of the transmission bandwidth when a station is capable of transmitting multiple frames onto the ring before releasing the token. The invention uses the token holding timer (THT) as a time base to calculate the maximum number of complete frames that can be transmitted within that time.

In a token ring network, a transmit station can send frames using either a single frame or a multi-frame mode. In single frame mode, a station sends only one frame for each usable token that it acquires. In multi-frame mode, a station sends multiple frames per usable token. The maximum number of frames a station can transmit per usable token is limited by the token holding timer which is specified in the applicable standard, i.e., either the IEEE 802.5 standard for token rings or the ANSI standard X3T9.5 for fiber distributed data interface (FDDI).

One way of managing the transmission of a multi-frame transmit sequence is for the transmit station to transmit its frame queue until it gets to the last frame in the queue. If, at that time, the THT has not expired, the transmitter terminates the transmit sequence by marking the intermediate frame bit (I-bit) in the ending delimiter of the current frame as the last frame. If the transmit frame sequence is not completed at the end of the THT window, the transmit station aborts the partially transmitted last frame and releases a token.

Although this method is simple and inexpensive to implement, a major disadvantage is that if the last frame transmitted is a long frame relative to the THT window and gets aborted due to expiration of the THT, the ring bandwidth used to transmit the partial last frame is wasted. This effectively reduces the throughput of the network. This method is only applicable to the ANSI X3T9.5 protocol for FDDI. It does not apply to the IEEE 802.5 protocol for token rings because the transmitter in this protocol does not release a token after aborting a frame.

Thus, there is a need to provide a method and apparatus for determining whether or not to transmit another frame waiting in the frame queue that eleminates the transmission of frames that otherwise would be aborted by the expiration of the token holding timer, and that is applicable to both the IEEE 802.5 and FDDI protocols.

SUMMARY OF THE INVENTION

It is therefore an object of this invention to provide a last frame decision algorithm for automatically adjusting the number of variable length frames transmitted in a multi-frame transmit sequence.

It is another object of this invention to provide a last frame decision algorithm that prevents the wasting of ring bandwidth caused by aborting the partial last frame transmitted when the maximum transmission time window expires.

It is a further object of this invention to provide a last frame decision algorithm that is applicable to both normal token release and early token release, to both the IEEE 802.5 and the ANSI X3T9.5 (FDDI) standards, and to both the single frame and multi-frame transmit modes.

It is a still further object of this invention to provide an apparatus for a last frame decision algorithm that is simple and inexpensive to implement, that is independent of network speed, and that does not require any time measuring circuitry.

These and other objects and advantages are accomplished by the present invention through a last frame decision algorithm which counts transmitted octets (bytes) instead of measuring time in making a decision to transmit another frame. The transmit station always looks ahead at the length of the next frame to be transmitted. At the start of each transmit sequence, the transmitter sets a counter identified as the total transmit length counter (TTLEN) which is used to manage the maximum amount of data bytes that the transmitter can send within the THT time window. The transmitter then decrements the TTLEN on each data byte that it transmits. Before transmitting the trailer of the current frame, the transmitter compares the length of the next frame (NFLEN) with the residual count value in the TTLEN counter. If the TTLEN counter value is less than the next frame length, the transmitter terminates the transmit sequence by marking the current frame as the last frame in the I-bit of the ending delimiter in the frame trailer, and then releasing the token if in early token release mode. If the TTLEN counter value is greater than the next frame length, the transmitter marks the current frame as an intermediate frame and continues to transmit the next frame. The last frame decision algorithm is performed before transmitting the frame check sequence (FCS) of each frame transmitted. The last frame decision algorithm does not waste any ring bandwidth if the total transmit queue exceeds the THT time window. The foregoing features and advantages of the invention will be more fully described below in conjunction with the accompanying drawings.

DESCRIPTION OF THE PREFERRED EMBODIMENT

The invention will be particularly described with respect to the frame structure used in the IEEE 802.5 protocol. A person skilled in the art will readily be able to apply the last frame decision algorithm described herein to the ANSI X3T9.5 protocol for FDDI or any other protocol using a ring topology.

The frame structure and delimiter patterns of the IEEE 802.5 token ring protocol are shown in FIGS. 1A-1E. The token ring frame structure is used here to illustrate the operation and timing of the last frame decision algorithm relative to the different fields of the frame.

Figure 1A:
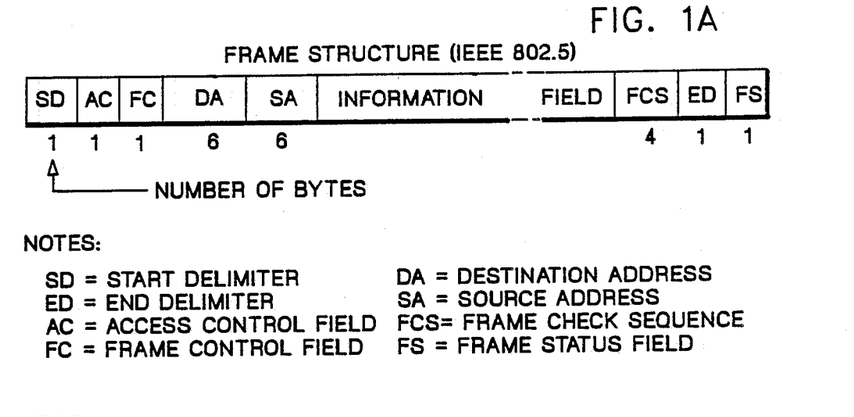
FIGS. 1A–1E illustrate the frame structure and delimiters used in conjunction with the IEEE 802.5 protocol standard.
Figure 1B:
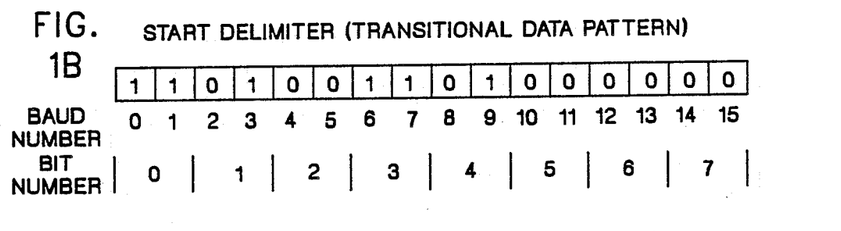
Figure 1C:
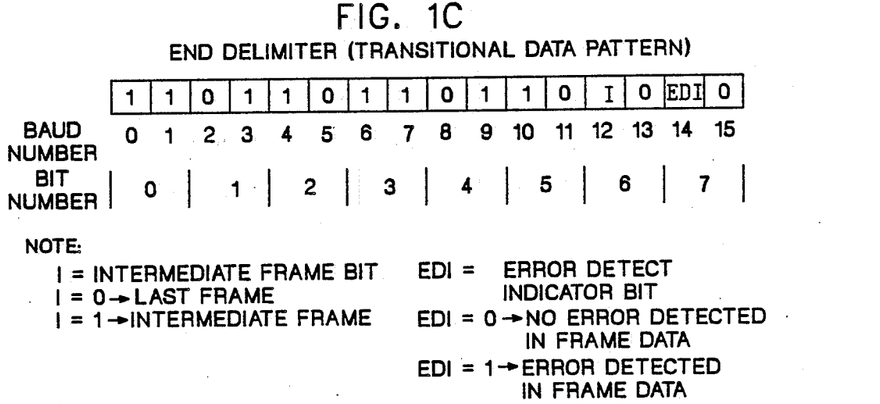
Figure 1D:
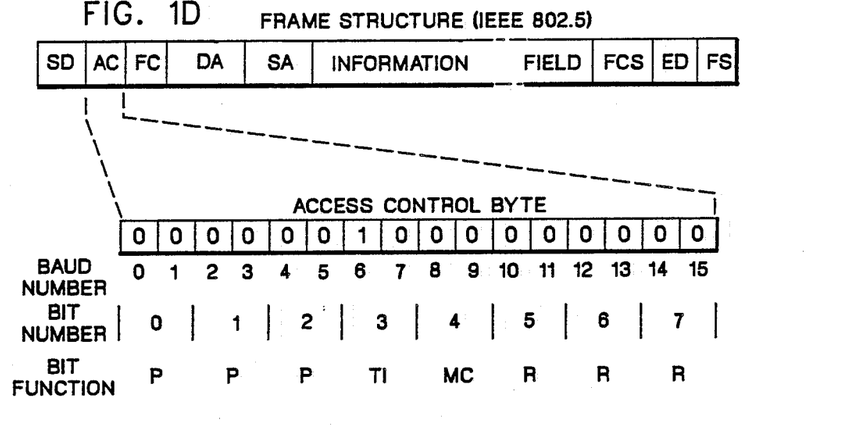
Figure 1E:
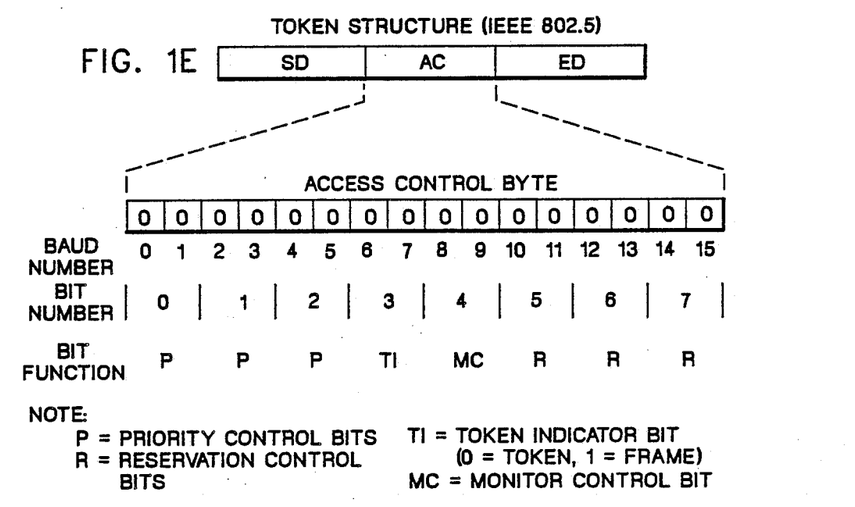

FIG. 1A shows overall frame structure which contains a starting delimiter (SD), access control field (AC), frame control field (FC), destination address (DA), source address (SA), information field, frame check sequence (FCS), ending delimiter (ED), and frame status field (FS). The frame header consists of the SD, AC, FC, DA and SA fields. The frame trailer consists of the FCS, ED and FS fields. FIGS. 1B and 1C show the starting delimiter and ending delimiter data patterns respectively. In IEEE 802.5 token ring application, only the first six bits of the ending delimiter are considered in decoding the pattern; the last two are ignored. The I-bit, which is used to indicate whether a frame is an intermediate frame or the last frame, follows in the first half of bit number 6. The I-bit is set by the transmitter to indicate whether the transmit frame is the last frame or an intermediate frame. A zero in the I-bit indicates the last frame. A one in the I-bit indicates an intermediate frame. FIG. 1D shows the bit pattern of the access control byte. The token indicator (TI) bit is used to indicate whether a frame (TI=1) or a token (TI=0) is being transmitted. FIG. 1E shows the bit pattern for a token which consists of a starting delimiter, access control byte and ending delimiter.

Figure 2:
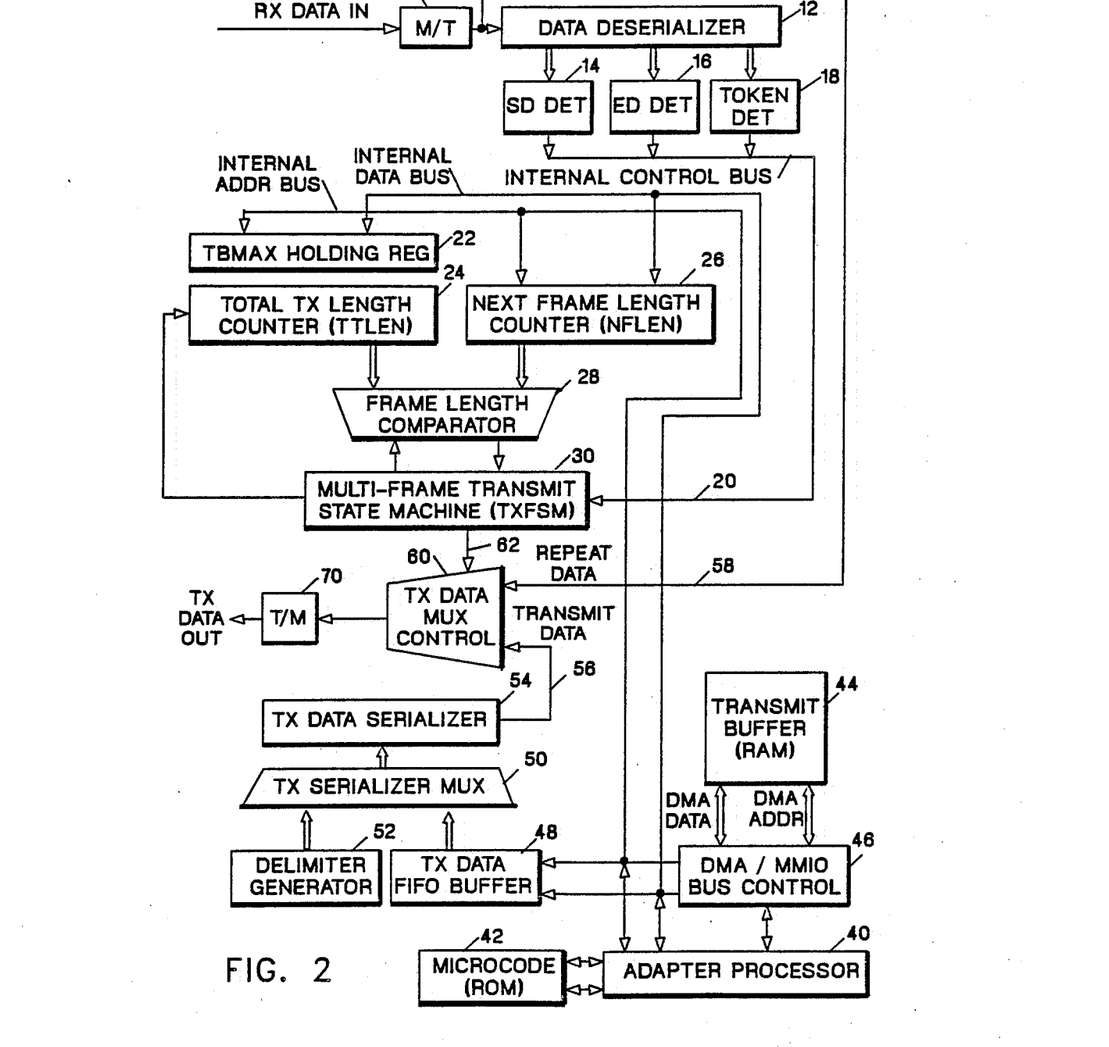
FIG. 2 illustrates a block diagram implementation of this invention.

A block diagram of the apparatus implementing the last frame decision algorithm is shown in FIG. 2. Incoming ring data is first converted from Differential Manchester code to Transitional code via the Manchester-to-Transitional decoder (M/T) 10. The decoded serial ring data is shifted into a 16-bit data deserializer 12 which deserializes a serial data stream into a parallel data stream. Tapping at the parallel output of data deserializer 12 are the starting delimiter (SD) detector 14, the ending delimiter (ED) 16, and the token detector 18 which are connected through an internal control bus 20 to the multi-frame transmit finite state machine (TXFSM) 30. The logic flow sequence employed in the last decision frame algorithm is controlled by TXFSM 30.

During a transmit operation, the adapter processor 40 through its microcode stored in read-only memory (ROM) 42 initiates the assigned transmit frame queues and stores them in transmit buffer 44 implemented in random access memory (RAM). The transmit data is transferred through the direct memory access (DAM) bus control block 46 into the transmit data first in-first out (FIFO) buffer 48. At the transmitter serializer multiplexer 50, the frame data and the delimiters generated by generator 52 are multiplexed into transmitter data serializer 54 according to the protocol frame structure. Here the parallel data stream is converted into a serial data stream and fed into the transmitter data multiplexer control block 60. Depending on whether the transmitter is in repeat mode or transmit mode, the transmit output is selected from the repeat data path 58 or from the transmit data path 56, respectively. Individual bits can be modified by the TXFSM 30 through line 62 as they pass through the transmitter data multiplexer control block 60. Finally, the serial transmit data which is in transitional code is converted back into Differential Manchester code by the Transitional-to-Manchester encoder (T/M) 70.

At the beginning of every multi-frame transmit sequence, the TXSFM 30 loads the maximum transmittable byte value (TBMAX) from a holding register 22 into the total transmit length counter (TTLEN) 24. TBMAX is loaded into holding register 22 during system initialization. At the end of each transmit frame, the TXFSM 30 loads the length of the next frame into the next frame length counter (NFLEN) 26, and initiates a comparison of the TTLEN and NFLEN counters 24, 26 in frame length comparator 28. The comparison results in TXFSM 30 setting the I-bit in the ending delimiter to the appropriate value depending on whether that frame is an intermediate frame or a final frame.

Figure 3A:
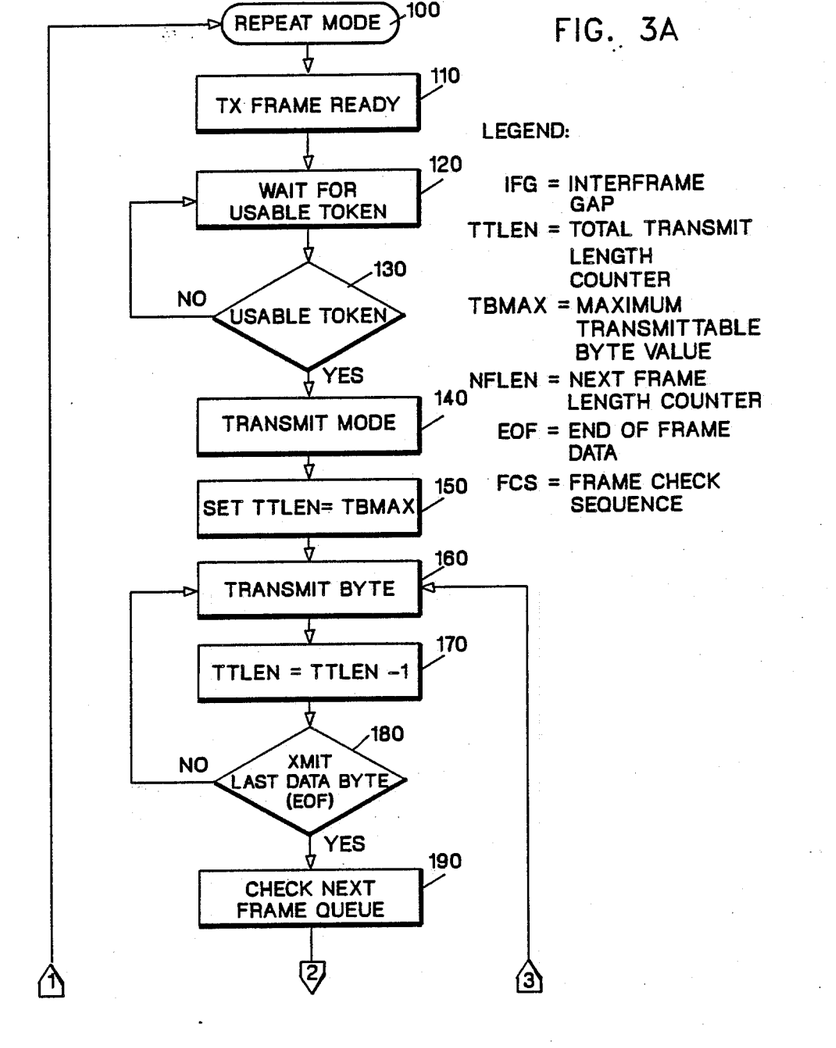
FIGS. 3A–3B illustrate a flow chart for the last frame decision algorithm of this invention.
Figure 3B:
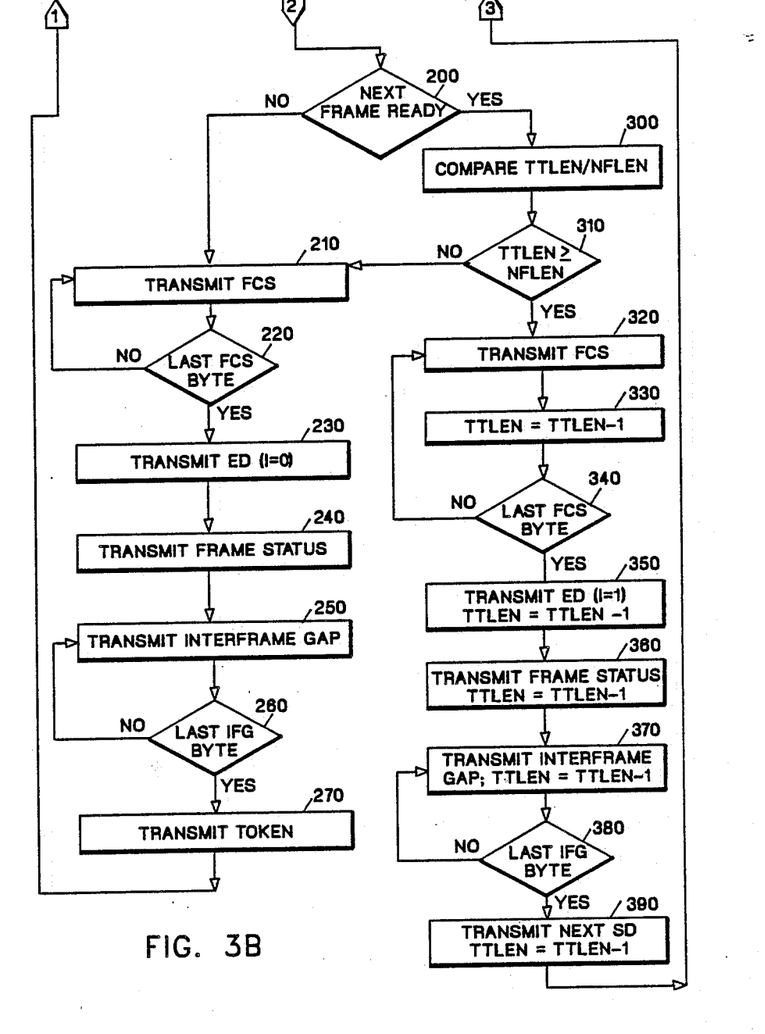

FIGS. 3A-3B illustrate a flow chart for the last frame decision algorithm. The algorithm starts with the transmitter in repeat mode as indicated in block 100. When an assigned transmit frame queue is ready to be transmitted (block 110), the transmitter starts looking for a usable token (block 120). After a usable token is acquired in block 130, the transmitter goes into transmit mode at the TI bit time in the access control field of the frame as indicated in block 140. The location of the TI bit was previously shown in FIG. 1D. Simultaneously, in block 150, the transmitter loads the maximum transmittable byte value (TBMAX) from holding register 22 into the total transmit length counter 24. The TBMAX value is calculated by microcode during adapter initialization and stored in the TBMAX holding register 22. The equation for calculating the TBMAX value is as follows:

$$TBMAX = THTB - [2(FCS + ED + FS + IFG) + 2(SD)]$$

where
- THTB = number of octets (bytes) in the token holding time window
- FCS = number of octets in the frame check sequence
- ED = number of octets in the ending delimiter
- FS = number of octets in the frame status field
- IFG = number of interframe gap octets
- SD = number of octets in the starting delimiter.

Once the TTLEN counter 24 is loaded with the TBMAX value, it is decremented in block 170 at the end of every transmitted byte (block 160). After the transmitter sends the last data byte in the information field of the frame being transmitted which is tested in decision block 180, it checks to see if there are any more frames waiting in the transmit queue in block 190.

If there are no additional frames in the transmit queue (decision block 200), the transmitter treats the current frame as the last frame. It transmits the four bytes of frame check sequence (block 210 and decision block 220), sets the I-bit to 0 in the trasmitted ending delimiter (block 230), transmits the 1 byte frame status field (block 240) and the interframe gap or IFG (block 250). After transmitting the last IFG byte (decision block 260), the token is released in block 270 if early token release is being employed. If in normal token release mode, idle characters are transmitted until the source address (SA) of the return frame is recognized, at which time the token is released. Releasing a token causes a transmitter to go into repeat mode (block 100).

If in decision block 200, another frame is found waiting in the transmit queue, the transmitter compares the current value is the TTLEN counter with the byte length of the next frame contained in the NFLEN counter in block 300. If the TTLEN value is less than the NFFLEN value (block 310), the remaining THT window is insufficient to send the next frame. The transmitter, therefore, treats the current frame as the last frame and repeats the process just described when there is no frame in the transmit queue, i.e., transmit the FCS, set the I-bit to 0 and transmit the ED, transmit the FS byte and IFG, and release the token.

If the TTLEN value is greater than or equal to the NFLEN value, the transmitter treats the current frame as an intermediate frame, transmits the FCS, sets the I-bit in the transmitted ending delimiter to one, transmits the FS byte, the IFG and the next frame. The TTLEN counter is decremented after each byte of the FCS (block 330 and decision block 340). Similarly, the TTLEN counter is decremented after each transmitted byte in block 350, 360 and 370 after transmitting the ending delimiter, the frame status byte and the inter-frame gap, respectively. After the last IFG byte is transmitted as indicated by decision block 380, the starting delimiter of the next frame is transmitted and the TTLEN counter is decremented again in block 390. At this point, control is transferred back to block 160 for transmission of the next frame. The process embodied in this sequence of steps continues until the last frame in the transmit queue is transmitted or until the remaining THT window is not long enough to send the next frame in the transmit queue.

Two additional points need to be clarified regarding the last frame decision algorithm. The first point is that the frame length of the first frame in the transmit queue is not checked. The reason the length is not checked is that the applicable standard restricts the maximum frame length of any transmit frame to be less than the byte capacity of the token holding timer (THT). Thus, the first frame in a multi-frame transmit queue should always be accommodated for transmission. The second point is that the last frame decision algorithm can be forced into a single frame transmit mode by setting the maximum transmittable byte value (TBMAX) to zero. Two examples are provided below on how TBMAX is calculated for a 16 Megabits per second (Mbps) and a 4 Mbps token ring.

Example 1:  Ring speed = 16,000,000 bits/sec
                      = 2,000,000 bytes / sec
            Byte Transmit time = 1 / 2,000,000 sec
                      = 5 E-7 sec
            Token Holding Timer (THT) = 10 msec
                      = 0.010 sec
            Number of bytes that can be transmitted in the
            THT window: THTB = 0.010 sec / 5 E-7 sec
                      = 20,000 bytes
            TBMAX = THTB − {2(FCS+ED+FS+IFG)+2(SD)}
                      = 20,000 − {2(4+1+1+5)+2(1)}
                      = 19,976 bytes Example 2:  Ring speed = 4,000,000 bits/sec
                      = 500,000 bytes / sec
            Byte Transmit time = 1 / 500,000 sec
                      = 2 E-6 sec
            Token Holding Timer (THT) = 10 msec
                      = 0.010 sec
            Number of bytes that can be transmitted in the
            THT window: THTB = 0.010 sec / 2 E-6 sec
                      = 5,000 bytes
            TBMAX = THTB − {2(FSC+ED+FS+IFG)+2(SD)}
                      = 5,000 − {2(4+1+1+1)+2(1)}
                      = 5,000 − 16
                      = 4,984 bytes In the above examples, the IFG on a 16 Mbps token ring is 5 bytes while on a 4 Mbps token ring, it is 1 byte.

Figure 4A:
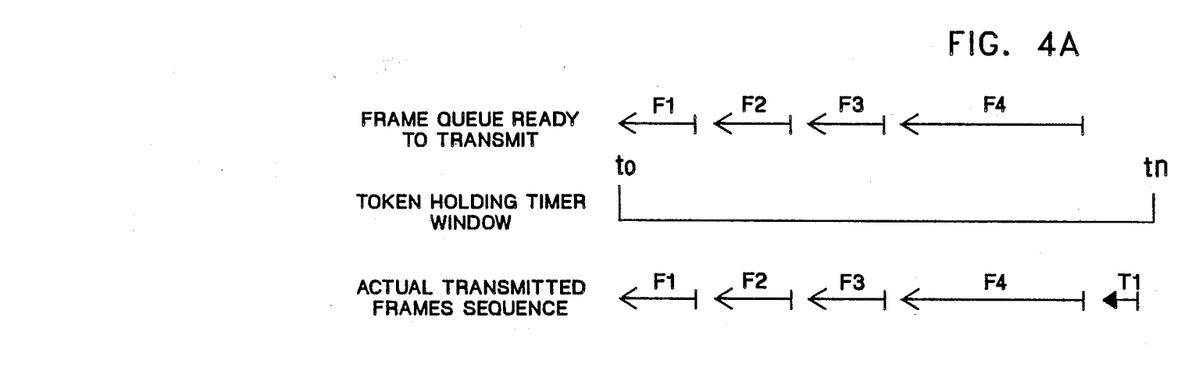
FIGS. 4A–4B illustrate scenarios demonstrating the two different last frame ending conditions handled by the last frame decision algorithm.
Figure 4B:
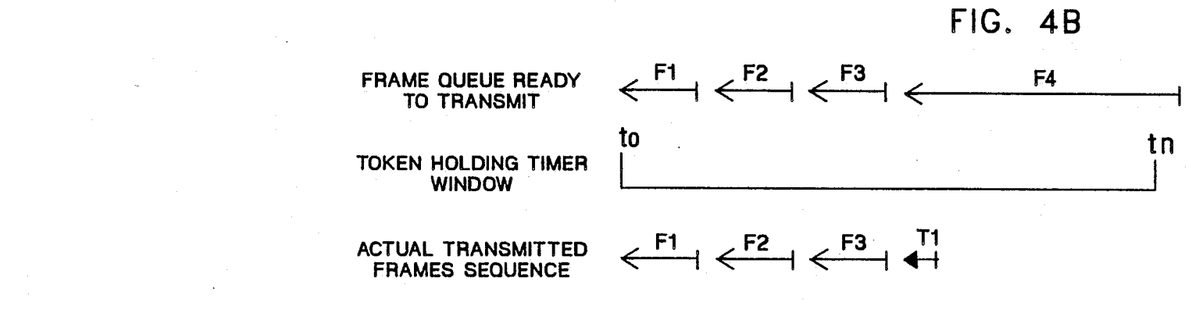

Scenarios demonstrating the two different last frame ending conditions handled by the last frame decision algorithm are shown in FIGS. 4A–4B. In FIG. 4A, the length of the assigned transmit frame queue ready to be transmitted containing frames F1, F2, F3 and F4 is shorter than a THT time window. In this case, the transmitter has enough time to send all the frames in the queue. Therefore, the actual transmitted frame queue is the same as the assigned frame queue ready to be transmitted. The token T1 is released after frame F4 is transmitted.

In FIG. 4B, the length of the assigned transmit frame queue ready to be transmitted is larger than the THT time window. In this case, the transmitter does not have enough time to send the last frame F4. The actual transmitted frame queue terminates at the end of the third frame F3 with the token released at the end. Frame F4 will be held for the next transmitting queue.

While the invention has been particularly shown and described with reference to the particular embodiment thereof, it will be understood by those skilled in the art that various changes in form and details may be made therein without departing from the spirit and scope of the invention.

Having thus described our invention, that we claim and desire to source by Letters Patent is as follows:

1. A method for controlling the transmission of frames onto a token ring in a computer network at an originating station, wherein each station in the network is capable of transmitting multiple frames onto the ring during a transmission time window after acquiring a transmit token, with each frame transmitted onto the ring having a frame header, an information field, and a frame trailer, said method comprising the steps of:

determining the maximum frame byte length that can be transmitted during the transmission time window;

transmitting frames waiting in a transmit buffer at said originating station and tracking the total number of bytes transmitted; and terminating the transmission of frames if the transmission of the next frame waiting to be transmitted results in the total number of bytes transmitted exceeding the maximum frame byte length.

2. The method of claim 1 including the step of terminating the transmission of frames if all of the frames waiting in the transmit buffer are transmitted before the total number of bytes transmitted exceeds the maximum frame byte length.

3. The method of claim 2 further including the step of releasing the transmit token immediately after terminating the transmission of frames if in early token release mode.

4. The method of claim 1 wherein the step of determining the maximum frame byte length includes the steps of:
   selecting the operating speed of the token ring;
   determining the total number of bytes that can be transmitted during the transmission time window; and
   subtracting the frame overhead associated with transmitting the frame header and the frame trailer from the total number of bytes that can be transmitted.

5. The method of claim 1 wherein the step of transmitting frames waiting in the transmit buffer includes:
   setting a first frame counter at the originating station to the maximum frame byte length;
   transmitting the first frame in the transmit buffer waiting to be transmitted;
   decrementing the first frame counter after each byte in said first frame is transmitted onto the ring;
   setting a second frame counter to the length of the next frame in the transmit buffer waiting to be transmitted;
   comparing the contents of said first frame counter with the contents of said second frame counter;
   transmitting the next frame if the contents in said first frame counter exceeds the contents of said second frame counter;
   decrementing said first frame counter after each byte in said next frame is transmitted; and
   repeating the steps of setting the second frame counter, comparing, transmitting the next frame, and decrementing said first frame counter until the contents of said second frame counter exceeds the contents of said first frame counter.

6. The method of claim 5 wherein the step of comparing is performed before the frame trailer of the current frame is transmitted and further includes marking the current frame as an intermediate frame if the contents of said first frame counter exceeds the contents of said second frame counter, and marking the current frame as the last frame if the contents of said second frame counter exceeds the contents of said first frame counter.

7. The method of claim 5 including the step of resetting the first frame counter to zero to place the originating station into a single frame transmit mode by forcing the contents of said second frame counter to exceed the contents of said first frame counter.

8. An apparatus for controlling the transmission of frames onto a token ring in a computer network at an originating station, wherein each station on the ring is capable of transmitting multiple frames onto the ring during a transmission time window after acquiring a transmit token with each frame transmitted onto the ring having a frame header, an information field, and a frame trailer, said apparatus comprising:
   means for determining the maximum frame byte length that can be transmitted during the transmission time window;
   buffer means for storing frames to be transmitted at said originating station;
   means for transmitting frames waiting in said transmit buffer at said originating station;
   means for tracking the total number of bytes transmitted during the transmission time window; and
   means for terminating the transmission of frames when the transmission of the next frame waiting to be transmitted would result in the total number of bytes transmitted exceeding the maximum transmittable byte length.

9. The apparatus of claim 8 including means for selecting the operating speed of said token ring.

10. The apparatus of claim 9 wherein said means for determining the maximum frame byte length includes logic means for converting said transmission time window into the number of bytes that can be transmitted in said window based on said operating speed.

11. The apparatus of claim 10 wherein the means for tracking the total number of bytes transmitted includes:
   a first counter means for counting in descending sequence the number of bytes transmitted during the transmission time window starting from the maximum frame byte length;
   a second counter means for holding the length of the next frame in the transmit buffer waiting to be tansmitted; and
   comparator means for comparing the contents of said first counter means and said second counter means.

12. An apparatus for controlling the transmission of frames onto a token ring in a computer network at an originating station, wherein each station on the ring is capable of transmitting multiple frames onto the ring during a transmission time window after acquiring a transmit token, said apparatus comprising:
   transmit buffer means for storing frames waiting to be transmitted at said originating station;
   adapter processor means for determining the maximum transmittable byte value and controlling the transmission of frames onto the token ring;
   FIFO buffer means for temporary storage of the next frame in the transmit buffer means waiting to be transmitted;
   direct memory access bus control means for transferring the next frame from the transmit buffer means to the FIFO buffer means;
   transmitter data serializer means for converting the next frame in the FIFO buffer means from a parallel data stream to a serial data stream;
   multi-frame transmit state machine means for determining if the next frame in said FIFO buffer means can be transmitted before the transmission time window has elapsed; and
   transmitter data multiplexer control means cooperative with said multi-frame transmit state machine means for transmitting the serial data stream from the transmitter data serializer onto the token ring.

13. The apparatus of claim 12 including:
   delimiter generator means for generating a frame header and a frame trailer for each transmitted frame; and
   transmitter serial multiplexer means cooperative with said delimiter generator means and said FIFO buffer means for appending the frame header and frame trailer to the next frame to be transmitted to form a complete frame and passing said complete frame to the transmitter data serializer means.

14. The apparatus of claim 12 further including:

register means cooperative with said adapter processor means for holding the maximum transmittable byte value;

total transmit length counter meand for counting in descending sequence beginning from the maximum transmittable byte value, the number of bytes transmitted during the transmission time window;

next frame length counter means cooperative with the direct memory access bus control means for holding the length of the next frame waiting to be transmitted; and frame length comparator means for comparing the contents of the total transmit length counter means and the next frame length counter means and providing an output signal resulting from the comparison to the multi-frame transmit finite state machine means.

15. The apparatus of claim 12 further including transitional-to-Manchester encoder means for coverting the serial data stream output of the transmitter data multiplexer control means from transitional code to Differential Machester code for transmission onto the ring.

* * * * *